US008027960B2

(12) United States Patent
Herbeck et al.

(10) Patent No.: US 8,027,960 B2
(45) Date of Patent: Sep. 27, 2011

(54) INTELLIGENT DELETION OF ELEMENTS TO MAINTAIN REFERENTIAL INTEGRITY OF DYNAMICALLY ASSEMBLED COMPONENTS IN A CONTENT MANAGEMENT SYSTEM

(75) Inventors: David Gerard Herbeck, Rochester, MN (US); John Edward Petri, St. Charles, MN (US)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 12/401,921

(22) Filed: Mar. 11, 2009

(65) Prior Publication Data

US 2010/0235327 A1 Sep. 16, 2010

(51) Int. Cl.
*G06F 17/30* (2006.01)
(52) U.S. Cl. .......................... 707/694; 707/609; 707/688
(58) Field of Classification Search .................. 707/694, 707/609, 688, 999.002
See application file for complete search history.

(56) References Cited

U.S. PATENT DOCUMENTS

| | | | | |
|---|---|---|---|---|
| 6,330,572 B1* | 12/2001 | Sitka | ............................ | 707/608 |
| 6,601,090 B1* | 7/2003 | Gurijala et al. | ............... | 709/213 |
| 7,062,158 B1* | 6/2006 | Ayaki | ............................ | 386/248 |
| 7,096,355 B1* | 8/2006 | Marvit et al. | .................. | 713/162 |
| 7,155,466 B2* | 12/2006 | Rodriguez et al. | ..... | 707/999.002 |
| 7,818,300 B1* | 10/2010 | Kilday et al. | .................. | 707/662 |
| 2001/0014103 A1* | 8/2001 | Burns et al. | ..................... | 370/429 |
| 2005/0223071 A1* | 10/2005 | Hosono | ......................... | 709/206 |
| 2005/0239494 A1* | 10/2005 | Klassen et al. | .............. | 455/550.1 |
| 2006/0004703 A1* | 1/2006 | Spivack et al. | ..................... | 707/2 |
| 2006/0004868 A1* | 1/2006 | Claudatos et al. | .......... | 707/104.1 |
| 2006/0059117 A1* | 3/2006 | Tolson et al. | ..................... | 707/2 |
| 2006/0077207 A1* | 4/2006 | O'Neill et al. | ................. | 345/543 |
| 2006/0156382 A1* | 7/2006 | Motoyama | ......................... | 726/1 |
| 2007/0050366 A1* | 3/2007 | Bugir et al. | ....................... | 707/9 |
| 2007/0073671 A1* | 3/2007 | McVeigh et al. | .................. | 707/4 |
| 2007/0276843 A1* | 11/2007 | Lillibridge et al. | ........... | 707/100 |
| 2007/0283417 A1* | 12/2007 | Smolen et al. | ..................... | 726/2 |
| 2008/0170563 A1* | 7/2008 | Zhu et al. | ........................ | 370/352 |
| 2008/0301237 A1* | 12/2008 | Parsons et al. | ................ | 709/206 |
| 2008/0307009 A1* | 12/2008 | Anderson et al. | ............. | 707/200 |
| 2010/0100845 A1* | 4/2010 | Khan et al. | ..................... | 715/810 |
| 2010/0205159 A1* | 8/2010 | Li et al. | ......................... | 707/694 |
| 2010/0306283 A1* | 12/2010 | Johnson et al. | ............... | 707/803 |

OTHER PUBLICATIONS

Eric Severson, Chief Technology Officer, Flatirons Solutions Corporation, Whitepaper, "Dynamic Content Delivery Using DITA", pp. 1-25, Copyright 2007 Flatirons Solutions Corporation.

\* cited by examiner

*Primary Examiner* — Hung T Vy
*Assistant Examiner* — Phuong-Thao Cao
(74) *Attorney, Agent, or Firm* — Martin & Associates, LLC; Derek P. Martin

(57) ABSTRACT

A content management system (CMS) uses an element deletion mechanism to maintain referential integrity of dynamically assembled elements in a repository. Element properties such as probability, popularity and recent usage that are not explicit relationships between parent documents and child elements are logged. A deletion policy is then defined in terms of the logged element properties. When a request to delete an element is received, the deletion mechanism checks the logged properties against the deletion policy. If the element's logged properties satisfy the deletion policy, the element is deleted from the repository. If the element's logged properties do not satisfy the deletion policy, the element is not deleted. In this manner referential integrity may be enforced for elements that are dynamically assembled.

13 Claims, 11 Drawing Sheets

```xml
<ViaibilityPolicy>
    <ElementViability degree="high">
        <Condition operator="AND">
            <Condition type="probability" ref="prob_policy1" operator="EQ">
                <Value val="high"/>
            </Condition>
            <Condition type="reuse_percentage" operator="GT">
                <Value val="50"/>
            </Condition>
            <Condition type="element_property" name="last_used" operator="GT">
                <Value val="12/10/2007"/>
            </Condition>
        </Condition>
    </ElementViability>
    <ElementViability degree="medium">
        <Condition operator="OR">
            <Condition operator="OR">
                <Condition type="probability" ref="prob_policy1" operator="NE">
                    <Value val="high"/>
                </Condition>
                <Condition operator ="AND">
                    <Condition type="reuse_percentage" operator="LE">
                        <Value val="50"/>
                    </Condition>
                    <Condition type="reuse_percentage" operator="GE">
                        <Value val="25"/>
                    </Condition>
                </Condition>
            </Condition>
            <Condition operator="AND">
                <Condition type="element_property" name="last_used" operator="GT">
                    <Value val="11/01/2007"/>
                </Condition>
                <Condition type="element_property" name="last_used" operator="LT">
                    <Value val="12/10/2007"/>
                </Condition>
            </Condition>
        </Condition>
    </ElementViability>
    <ElementViability degree = "low">
    </ElementViability>
</ViabilityPolicy>
```

```
<DeletionPolicy>
    <Condition operator="OR">
        <Condition operator="AND">
            <Condition type="user_role" operator="IN">
                <Value val="regulatory_admin"/>
            </Condition>
            <Condition type="element_viability" operator="LT">
                <Value val="high"/>
            </Condition>
        </Condition>
        <Condition operator="OR">
            <Condition operator="AND">
                <Condition type="user_role" operator="IN">
                    <Value val="regulatory_contributor"/>
                </Condition>
                <Condition type="element_viability" operator="EQ">
                    <Value val="low"/>
                </Condition>
            </Condition>
            <Condition type="element_property" name="creator" operator="IN">
                <Value val="regulatory_contributor"/>
            </Condition>
        </Condition>
    </Condition>
    <Notifications allowDeleteWithoutNotification="false">
        <Role name="regulatory_admin"/>
        <User name="DOCUMENT_CREATOR"/>
    </Notifications>
</DeletionPolicy>
```

FIG. 17

INTELLIGENT DELETION OF ELEMENTS TO MAINTAIN REFERENTIAL INTEGRITY OF DYNAMICALLY ASSEMBLED COMPONENTS IN A CONTENT MANAGEMENT SYSTEM

BACKGROUND

1. Technical Field

This disclosure generally relates to content management systems, and more specifically relates to maintaining referential integrity of dynamically assembled components when deleting elements in the repository of a content management system.

2. Background Art

A content management system (CMS) allows many users to efficiently share electronic content such as text, audio files, video files, pictures, graphics, etc. Content management systems typically control access to content in a repository. A user may generate content, and when the content is checked into the repository, the content may be subsequently processed by the CMS according to predefined rules. A user may also check out content from the repository, or link to content in the repository while generating content. The rules in a CMS assure that content that comes into or out of the system or that is linked to meets desired criteria specified in the rules.

One way for known content management systems to create documents is by dynamic compound document assembly. Dynamic compound document assembly involves retrieving elements from the repository and assembling the elements into a parent document. For example, this might occur according to an assembly template or from manual ad hoc assembly. The assembly template dictates which elements are to be retrieved and where the elements are supposed to be linked into the parent document. The parent document contains explicit relationships as formal links to each of the elements in the parent document. When the parent document is checked into the repository, the formal links are all checked against applicable rules, thereby enforcing referential integrity.

Today, content management systems are moving to provide dynamic content delivery. Dynamic content delivery refers to the ability to assemble components "on the fly." Dynamic content delivery may involve receiving user input, and then dynamically assembling a document to match the document requested by the user. In the alternative, dynamic content delivery may involve an automated process for dynamically assembling a document without user input, for example, based on some criteria. Document maps provide a backbone to describe how the dynamically assembled document is generated, but the explicit relationships (e.g., formal links) between parent documents and the elements do not exist. The lack of explicit relationships provides for greater flexibility in creating documents, and allows the CMS to receive input from a user or from other parameters and assemble documents dynamically. For example, a customer document may be automatically generated and rendered to a user's web browser based on data the user enters into a form.

One of the problems with dynamic content delivery is that referential integrity can be compromised. Without the explicit relationships between parent and child elements, and because a dynamically generated document may not be checked into the repository, elements required to create certain documents could be deleted, which would make it impossible to create that document. In content management systems where there is an explicit relationship (e.g., formal link) between parent and child documents, the owner of the parent document could be alerted when a child document is deleted, and/or the deletion of the child document could be prevented. This is not the case in dynamic content delivery as the parent document (i.e. document map) never knows which child elements it will be including when it prepares the document. Without a way to enforce referential integrity when deleting elements in a repository, the computer industry cannot fully utilize dynamic content delivery in a content management system.

BRIEF SUMMARY

A content management system (CMS) uses an element deletion mechanism to maintain referential integrity of dynamically assembled elements in a repository. Element properties such as probability, popularity and recent usage that are not explicit relationships between parent documents and child elements are logged. A deletion policy is then defined in terms of the logged element properties. When a request to delete an element is received, the deletion mechanism checks the logged properties against the deletion policy. If the element's logged properties satisfy the deletion policy, the element is deleted from the repository. If the element's logged properties do not satisfy the deletion policy, the element is not deleted. In this manner referential integrity may be enforced for elements that are dynamically assembled.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 16 shows a sample viability policy for the specific example herein;

FIG. 17 shows a sample deletion policy for the specific example herein; and

DETAILED DESCRIPTION

Many known content management systems use extensible markup language (XML) due to its flexibility and power in managing diverse and different types of content. One known content management system that uses XML is Solution for Compliance in a Regulated Environment (SCORE) developed by IBM Corporation. XML is growing in popularity, and is quickly becoming the preferred format for authoring and publishing. While the disclosure herein discusses XML documents as one possible example of content that may be managed by a content management system, the disclosure and claims herein expressly extend to content management systems that do not use XML.

Figure 1:
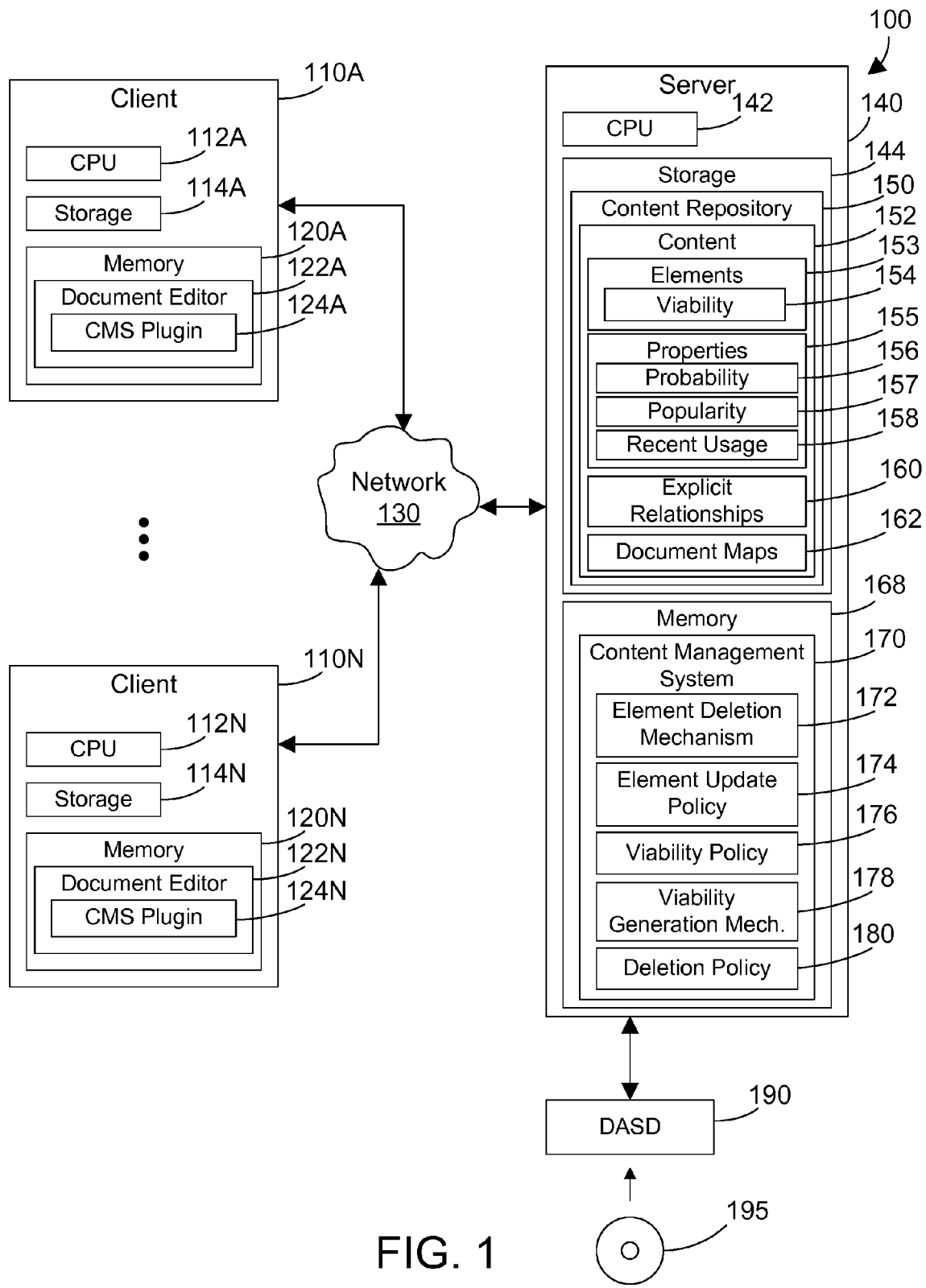
FIG. 1 is a block diagram of a networked computer system that includes a server computer system that has a content management system that includes an element deletion mechanism that deletes an element from the repository if the element's logged properties satisfy a deletion policy.

Referring to FIG. 1, networked computer system 100 includes multiple clients, shown in FIG. 1 as clients 110A, . . . , 110N, coupled to a network 130. Each client preferably includes a CPU, storage, and memory that contains a document editor, and a content management system (CMS) plugin. Thus, client 110A includes a CPU 112A, storage 114A, memory 120A, a document editor 122A in the memory 120A that is executed by the CPU 112A, and a CMS plugin 124A that allows the document editor 122A to interact with content 152 in the repository 150 that is managed by the CMS 170 in server 140. In similar fashion, other clients have similar components shown in client 110A, through client 110N, which includes a CPU 112N, storage 114N, memory 120N, a document editor 122N, and a CMS plugin 124N.

The CMS 170 resides in the main memory 168 of a server computer system 140 that also includes a CPU 142 and storage 144 that includes a content repository 150 that holds content 152 managed by the CMS 170. Content 152 may include one or more elements 153, properties 155, explicit relationships 160, and document maps 162. Each of the elements 153 preferably contains a viability value 154. Viability value 154 indicates the usefulness of each element. The explicit relationships 160 are formal links between objects in the repository. Examples of explicit relationships 160 are links between a compound assembly document (i.e., parent) and its constituent child elements. Document maps 162 define documents that may be assembled on-the-fly, and as such, the document maps 162 typically lack explicit relationships to child elements. As used in the disclosure and claims herein, the term "document map" means any type of skeleton, backbone, or template that indicates how to link elements into a document, and the term "element" means any section or portion of a document map that may be individually displayed or accentuated, whether actually in the document or linked to the document. Note that a document map may be very similar to known assembly templates, or may be very different, providing much greater flexibility in assembling documents on the fly.

Properties 155 represent properties of elements that may be logged by the content management system 170. Properties 155 may be stored in the elements or may be stored in a data structure separate from the elements. In addition, some of properties 155 may be stored in the elements while others are stored separate from the elements. Suitable properties that may be logged by the CMS include probability 156, popularity 157 and recent usage 158. As used in the disclosure and claims herein, "probability" means the likelihood of a particular element being reused in a particular situation, "popularity" is the measure of a particular element having been reused in the CMS by at least one document map, and "recent usage" means the date and time the element was last used in a document map. One suitable way to calculate probability is the time since the element has been created. Another suitable way to calculate probability is a ratio of the document maps in the repository that use an element of the same type to the total number of document maps in the repository. The disclosure and claims herein extend to any way to determine the probability that an element will be reused. Of course, any suitable property could be logged. The disclosure and claims herein expressly extend to the logging of any suitable element properties by the CMS that are not defined in explicit relationships 160.

One example of a suitable server computer system 140 is an IBM eServer System i computer system. However, those skilled in the art will appreciate that the disclosure herein applies equally to any type of client or server computer systems, regardless of whether each computer system is a complicated multi-user computing apparatus, a single user workstation, or an embedded control system. CMS 170 includes an element deletion mechanism 172, an element update policy 174, a viability policy 176, a viability generation mechanism 178, and a deletion policy 180. The viability policy 176 preferably defines criteria for setting a viability value for an element based on the logged properties 155 corresponding to the element. Element deletion mechanism 172 checks the logged properties 155 against deletion policy 180, and only deletes the element if deletion policy 180 allows deletion of the element. In one specific implementation, the logged properties 155 are used to generate a viability value 154 according to the viability policy 176. In this specific implementation, the element deletion mechanism 172 checks the viability value 154 against the deletion policy 180, and only deletes the element if deletion policy 180 allows deletion of the element.

Element update policy 174 indicates when viability value 154 should be updated. Element update policy 174 could be defined by a user, or autonomically by the system according to system trends. One suitable implementation updates the viability value 154 after a certain time interval has passed, such as once per day. Another suitable implementation updates the viability value when the element is used in a document. Yet another suitable implementation updates the viability value when the request to delete the element is received. The specification and claims herein extend to any way to define when the viability value for an element should be updated.

Viability policy 176 specifies criteria for determining a viability value for an element based on the logged properties 155 for the element. The viability generation mechanism 178 generates the viability value 154 for an element based on the logged properties 155 for the element and based on the criteria specified in the viability policy 176. In the most preferred implementation, the viability value 154 is specified in fuzzy values such as "low", "medium" and "high."

Deletion policy 180 defines criteria for deleting an element according to the element's logged properties 155. In the most preferred implementation described herein, the deletion policy 180 is specified in terms of a viability value 154 that is derived from the logged properties 155 and viability policy 176. In addition, the deletion policy may take into account the role of the user attempting to delete the element. For example, the deletion policy could allow deletion of an element with 'low' viability when the user is in a contributor role, and not allow deletion of an element with 'medium' or 'high' viability unless the user is in an administrator role. Additionally, deletion policy 180 could not allow deletion if the viability is 'high' regardless of the role of the user who requests to delete the element.

In FIG. 1, repository 150 is shown separate from content management system 170. In the alternative, repository 150 could be within the content management system 170. Regardless of the location of the repository 150, the content management system 170 controls access to content 152 in the repository 150.

Server computer system 140 may include other features of computer systems that are not shown in FIG. 1 but are well-known in the art. For example, server computer system 140 preferably includes a display interface, a network interface, and a mass storage interface to an external direct access storage device (DASD) 190. The display interface is used to directly connect one or more displays to server computer system 140. These displays, which may be non-intelligent (i.e., dumb) terminals or fully programmable workstations, are used to provide system administrators and users the ability to communicate with server computer system 140. Note, however, that while a display interface is provided to support communication with one or more displays, server computer system 140 does not necessarily require a display, because all needed interaction with users and other processes may occur via the network interface.

The network interface is used to connect the server computer system 140 to multiple other computer systems (e.g., 110A, . . . , 110N) via a network, such as network 130. The network interface and network 130 broadly represent any suitable way to interconnect electronic devices, regardless of whether the network 130 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The mass storage interface is used to connect mass storage devices, such as a direct access storage device 190, to server computer system 140. One specific type of direct access storage device 190 is a readable and writable CD-RW drive, which may store data to and read data from a CD-RW 195.

Main memory 168 preferably contains data and an operating system that are not shown in FIG. 1. A suitable operating system is a multitasking operating system known in the industry as i5/OS; however, those skilled in the art will appreciate that the spirit and scope of this disclosure is not limited to any one operating system. In addition, server computer system 140 utilizes well known virtual addressing mechanisms that allow the programs of server computer system 140 to behave as if they only have access to a large, single storage entity instead of access to multiple, smaller storage entities such as main memory 168, storage 144 and DASD device 190. Therefore, while data, the operating system, and content management system 170 may reside in main memory 168, those skilled in the art will recognize that these items are not necessarily all completely contained in main memory 168 at the same time. It should also be noted that the term "memory" is used herein generically to refer to the entire virtual memory of server computer system 140, and may include the virtual memory of other computer systems coupled to computer system 140.

CPU 142 may be constructed from one or more microprocessors and/or integrated circuits. CPU 142 executes program instructions stored in main memory 168. Main memory 168 stores programs and data that CPU 142 may access. When computer system 140 starts up, CPU 142 initially executes the program instructions that make up the operating system.

Although server computer system 140 is shown to contain only a single CPU, those skilled in the art will appreciate that a content management system 170 may be practiced using a computer system that has multiple CPUs. In addition, the interfaces that are included in server computer system 140 (e.g., display interface, network interface, and DASD interface) preferably each include separate, fully programmed microprocessors that are used to off-load compute-intensive processing from CPU 142. However, those skilled in the art will appreciate that these functions may be performed using I/O adapters as well.

At this point, it is important to note that while the description above is in the context of a fully functional computer system, those skilled in the art will appreciate that the content management system 170 may be distributed as an article of manufacture in a variety of forms, and the claims extend to all suitable types of computer-readable media used to actually carry out the distribution, including recordable media such as floppy disks and CD-RW (e.g., 195 of FIG. 1).

The CMS herein may also be delivered as part of a service engagement with a client corporation, nonprofit organization, government entity, internal organizational structure, or the like. This may include configuring a computer system to perform some or all of the methods described herein, and deploying software, hardware, and web services that implement some or all of the methods described herein. This may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Figure 2:
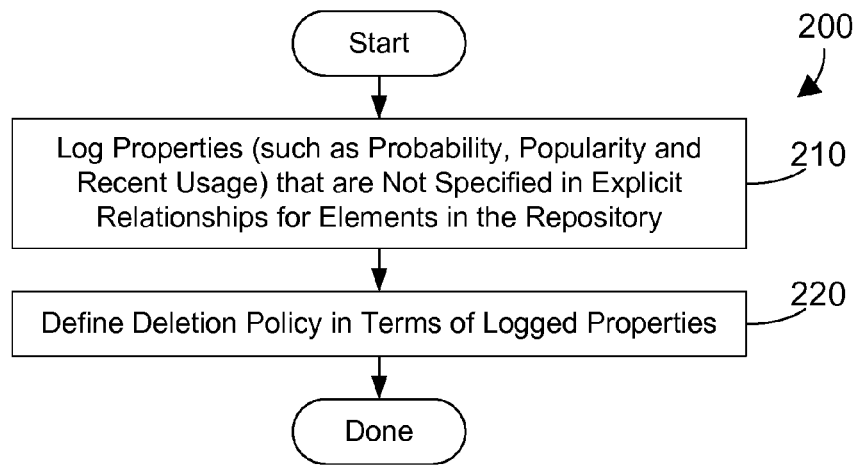
FIG. 2 is a flow diagram of a method for defining a deletion policy in terms of logged properties that are not specified in explicit relationships in the repository.

Referring to FIG. 2, a method 200 shows the steps for defining a deletion policy in terms of logged properties. Properties relating to the elements that are not specified in explicit relationships for the elements are logged (step 210). A deletion policy is then defined in terms of the logged properties (step 220). In this manner the deletion policy is defined based on logged properties of elements that are not represented in the explicit relationships in the repository, thereby taking into account logged usage of elements by document maps that lack the explicit relationships between parent and child elements. The logged usage allows enforcing referential integrity for elements that are dynamically assembled.

Figure 3:
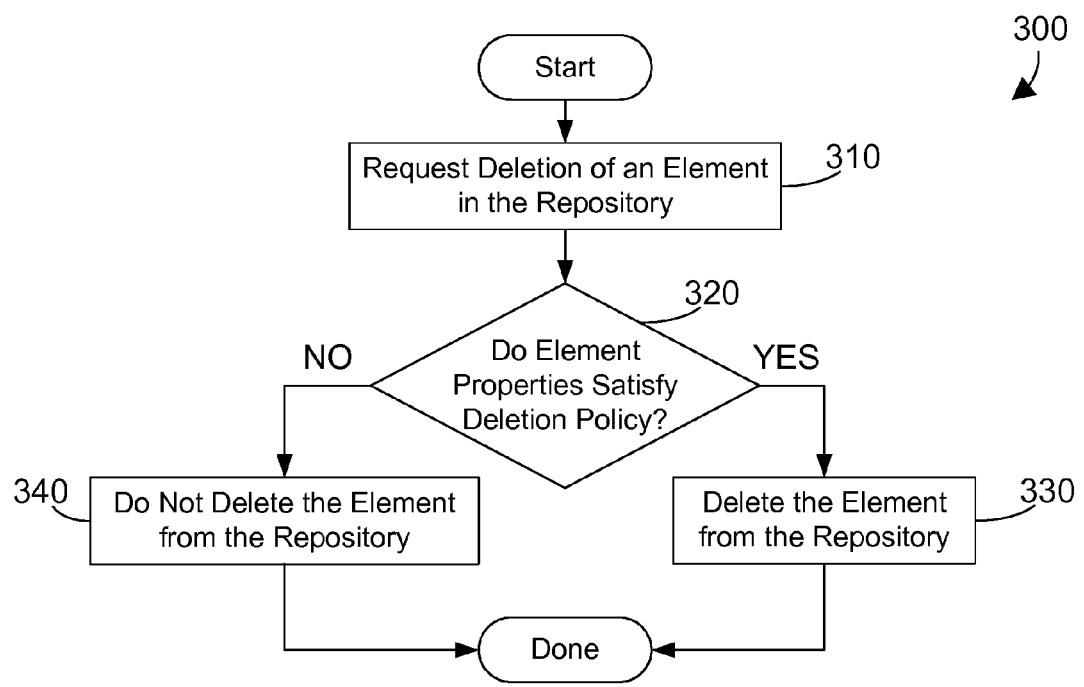
FIG. 3 is a flow diagram of a method for deleting elements from the repository according to a deletion policy.

Referring to FIG. 3, a method 300 shows steps for processing a request to delete an element in the repository. The request is received (step 310). If the element properties satisfy the deletion policy (step 320=YES), the element is deleted from the repository (step 330). If the element properties do not satisfy the deletion policy (step 320=NO), the element is not deleted from the repository (step 340). Note the term "element properties" in step 320 may include explicit relationships 160 in the CMS. The element properties in step 320 may additionally or in the alternative include logged properties 155, or something (like the viability value 154) that is derived from the logged properties 155, or both. In the disclosure and claims herein, the element properties checked in step 320 include properties that are not included in explicit relationships 160, allowing method 300 to take into account properties that represent on-the-fly use of the elements that are not represented in explicit relationships 160.

Figure 4:
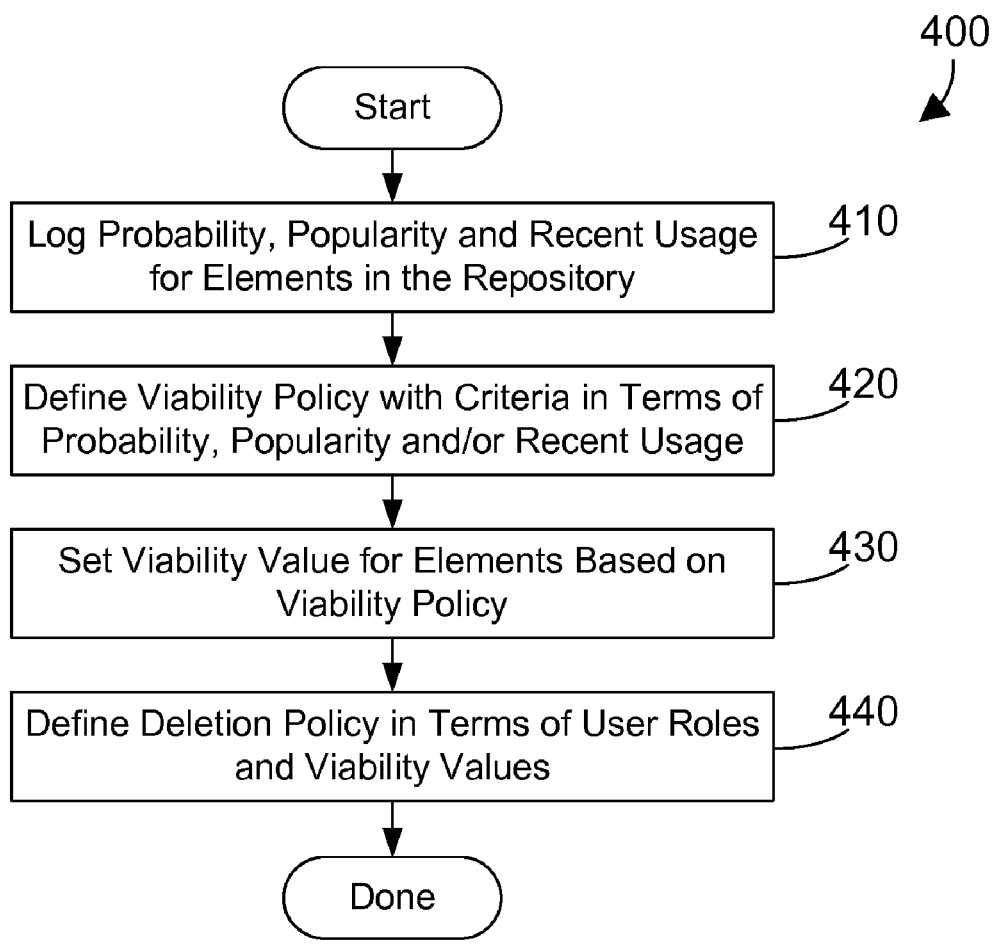
FIG. 4 is a flow diagram of a method that represents one specific implementation of method 200 in FIG. 2.

Referring to FIG. 4, a method 400 represents one suitable implementation for method 200 in FIG. 2. The probability, popularity and recent usage for elements in the repository are logged (step 410). A viability policy (e.g., 176 in FIG. 1) is then defined with criteria in terms of the logged probability, popularity and/or recent usage (step 420). Note that the viability policy may specify any or all of the logged properties. A viability value (e.g., 154 in FIG. 1) for an element is then set based on the viability policy (step 430). The deletion policy (e.g., 180 in FIG. 1) is then defined, preferably in terms of user roles and viability values (step 440). Note the deletion policy may include parameters that allow or require notification to one or more specific users when deletion of an element is requested or performed. The specific implementation shown in method 400 in FIG. 4 provides an efficient way to log properties for elements that are not included in the explicit relationships 160 so on-the-fly usage of components can be accounted for when determining whether or not to allow deletion of an element in the repository.

Once the steps of method 400 have been performed, method 500 may be performed to process a request to delete an element in the repository. The request is received (step 510). If the element properties satisfy the deletion policy (step 520=YES), the element is deleted from the repository (step 530). If the deletion policy specifies to send notification that the element was deleted (step 550=YES), the notification is sent (step 560). If the deletion policy does not specify to send notification that the element was deleted (step 550=NO), method 500 is done. If the element properties do not satisfy the deletion policy (step 520=NO), the element is not deleted from the repository (step 540). If the deletion policy specifies to send notification of an unsuccessful attempt to delete an element (step 570=YES), the notification is sent (step 560). If the deletion policy does not specify to send notification of an unsuccessful attempt to delete an element (step 570=NO), method 500 is done.

Viability value 154 for each element 153 is determined according to viability policy 176. Viability policy 176 preferably includes criteria based on probability 156, popularity 157, and recent usage 158. For example, if an element's popularity is high, and the element was used within the last month, the element's viability could be assigned the value "high." While the viability values "high", "medium", and "low" are the only viability values discussed herein, the specification and claims expressly extend to any number or type of viability value. Note the viability values of high, medium and low are fuzzy values that may be defined in any suitable way, allowing fuzzy logic techniques to be used in determining an appropriate viability value for an element, and for determining whether the viability value satisfies the deletion policy.

Figure 6:
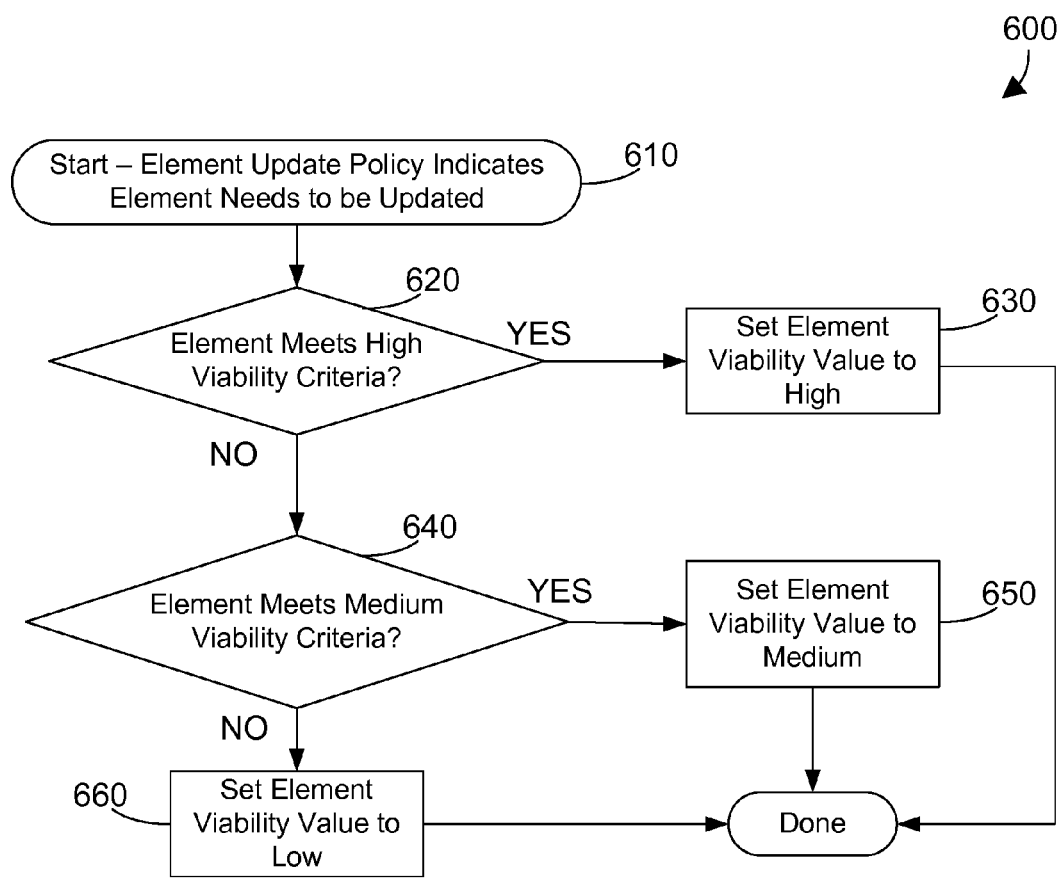
FIG. 6 is a flow diagram of a method for updating the viability value of an element in the repository.

Referring to FIG. 6, a method 600 shows one suitable method for updating an element's viability value. Method 600 starts when the element update policy indicates that an element needs to be updated (step 610). If the element meets the high viability criteria (step 620=YES), then the element's viability value is set to "high" (step 630) and method 600 is done. If the element does not meet the high viability criteria (step 620=NO), then method 600 moves to step 640. If the element meets the medium viability criteria (step 640=YES), then the element's viability value is set to "medium" (step 650) and method 600 is done. If the element does not meet the medium viability criteria (step 640=NO), then the element's viability value is set to "low" (step 660) and method 600 is done.

As shown in FIG. 6, one suitable implementation of viability criteria is to define "low" as the default viability. Another suitable implementation is to explicitly define each viability value. While the default implementation is discussed herein, the specification and claims herein expressly extend to any way to define a viability value for an element in a content management system.

Figure 7:
FIGS. 7-9 show sample elements for a specific example herein.
Figure 8:
Figure 9:
Figure 10:
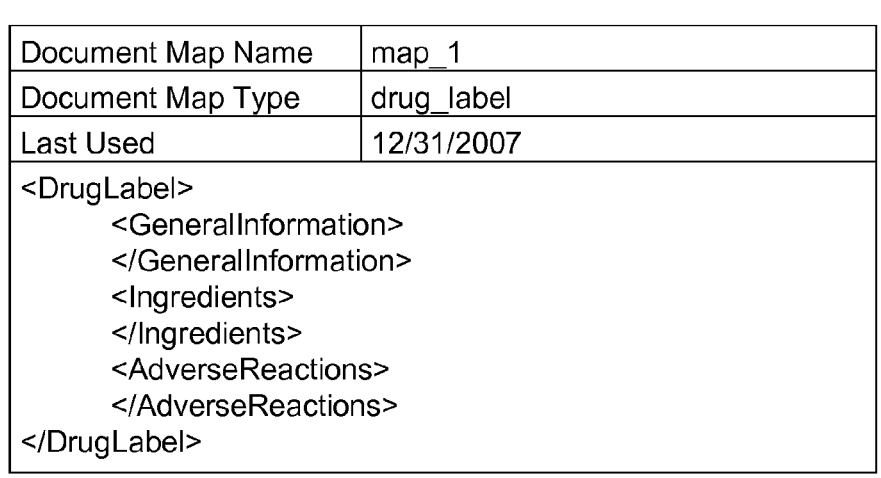
FIG. 10 shows a first sample document map for the specific example herein.
Figure 11:
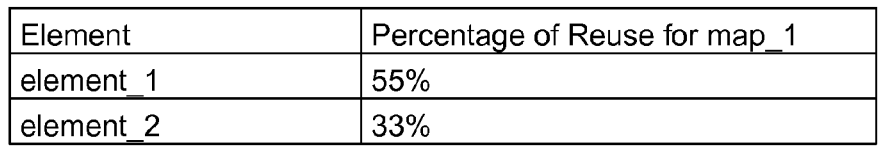
FIG. 11 shows a sample set of link data for document map 1000 in FIG. 10 indicating popularity of the elements.
Figure 12:
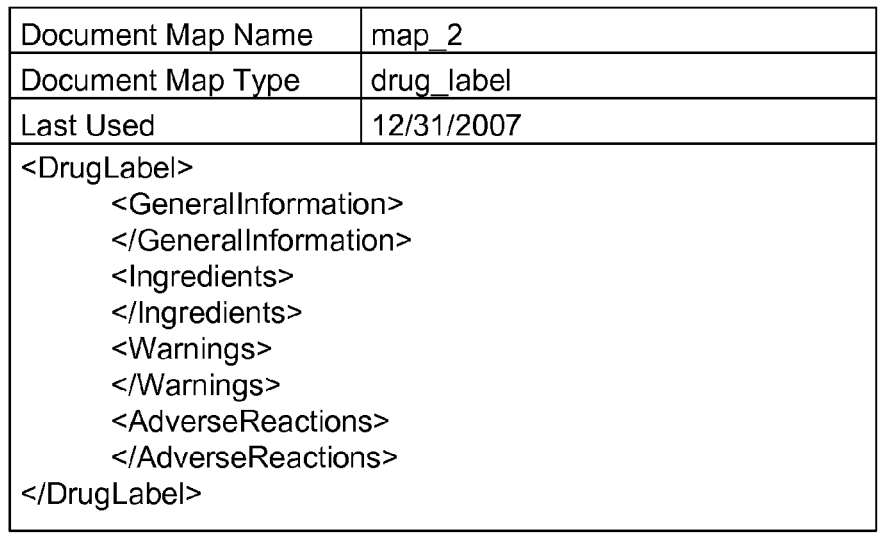
FIG. 12 shows a second sample document map for the specific example herein.
Figure 13:
FIG. 13 shows a sample set of link data for document map 1200 in FIG. 12 indicating popularity of the elements.
Figure 14:
FIG. 14 shows a third sample document map for the specific example herein.
Figure 15:
FIG. 15 shows a sample set of link data for document map 1400 in FIG. 14 indicating popularity of the elements.

Three simple examples are now given using FIGS. 7-20 to illustrate the methods of FIGS. 2-6. In the current examples we will use SCORE's XML content management system by IBM. While the examples herein discuss SCORE's XML content management system as one possible example of a content management system, the disclosure and claims herein expressly extend to any content management system. For the examples herein, FIGS. 7-9 show elements 700, 800, and 900, respectively, that reside in a repository. FIGS. 10, 12, and 14 show document maps 1000, 1200, and 1400 that reside in the repository. FIGS. 11, 13, and 15 show sample sets of link data 1100, 1300, and 1500 for document maps 1000, 1200, and 1400 respectively. FIG. 16 shows a sample viability policy 1600 for the three examples discussed herein. FIG. 17 shows a sample deletion policy 1700 for the three examples discussed herein. We assume the logged properties (i.e., 155 in FIG. 1) indicate the probability for documents 700 and 800 is high while the probability for document 900 is less than high. We also assume for these examples that notification will always occur (step 550=YES and step 570=YES in FIG. 5).

In the first example, an administrator attempts to delete element 700 shown in FIG. 7. We assume for the purposes of the examples herein that the element update policy (e.g., 174 in FIG. 1) indicates that the viability should be updated when a request is received from a user to delete the element. Other implementations could update the viability on a periodic basis, thus the steps in the example to update the viability would not be needed in those implementations. Thus when the administrator attempts to delete element 700, the element update policy indicates the element's viability value needs to be updated (step 610 in FIG. 6).

Viability policy 1600 defines how to assign the viability value for an element. According to viability policy 1600 in FIG. 16, an element is assigned a viability value of "high" when the element's probability is high, the popularity is greater than 50 percent, and the element was last used after Dec. 10, 2007. An element is assigned a viability value of "medium" when the element's probability is high or the popularity is between 25 and 50 percent, or the element was last used between Nov. 1, 2007 and Dec. 10, 2007. An element is assigned a viability value of "low" as the default (i.e. when it does not meet the high or medium criteria). For element 700, the probability is high, document map 1100 reuses element 700 55 percent of the time as shown in FIG. 11, and element 700 was last used on Dec. 15, 2007, as shown in FIG. 7. Thus element 700 meets all of the criteria for high viability (step 620=YES in FIG. 6), and element 700 is assigned a viability value of "high" shown in FIG. 18 (step 630 in FIG. 6).

Figure 5:
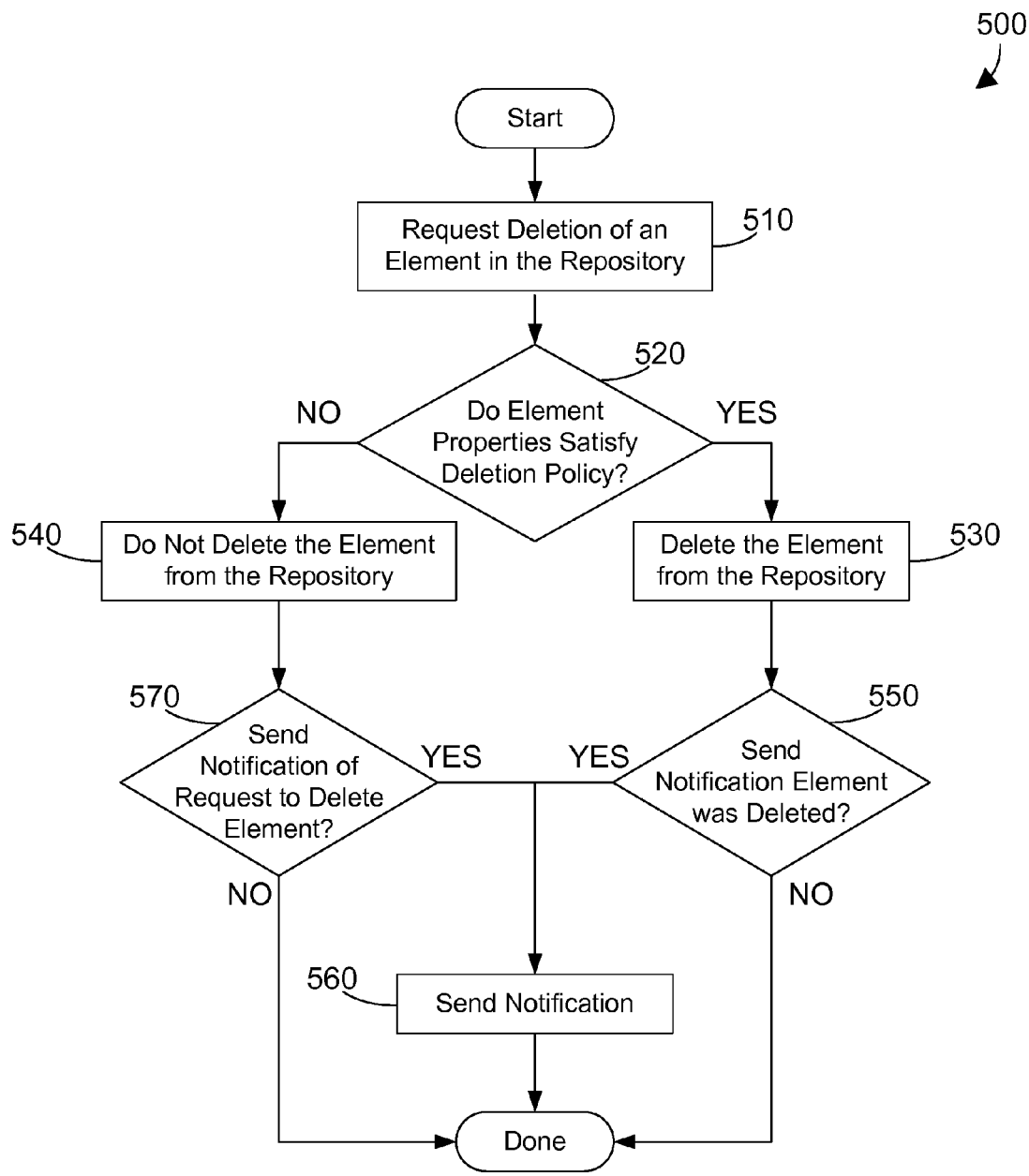
FIG. 5 is a flow diagram of a method for deleting elements from the repository according to a deletion policy and providing notifications.
Figure 18:
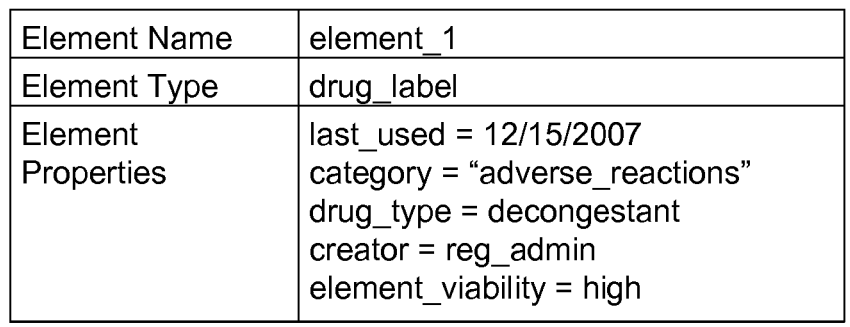
FIGS. 18-20 show the sample elements 700, 800, and 900 after the viability has been updated according to viability policy 1600 in FIG. 16.

Now that element 700 has been updated, shown as element 700 in FIG. 18, the element deletion mechanism checks the element against deletion policy 1700 to determine if element 700 can be deleted (step 520 in FIG. 5). Deletion policy 1700 defines that an element can be deleted if (1) the user is an administrator and the viability is less than high, or (2) the user is a contributor and the viability is low, or (3) the creator of the element is a contributor. The viability of element 700 is high which fails test (1). The user in the first example is an administrator which fails test (2), and element 700 was created by an administrator which fails test (3). Element 700 fails all of the criteria in deletion policy 1700 (step 520=NO in FIG. 5) and thus will not be deleted (step 540 in FIG. 5). However, a notification will still be sent to indicate that a request has been received to delete element 700 (step 570=YES and step 560 in FIG. 5).

Figure 19:
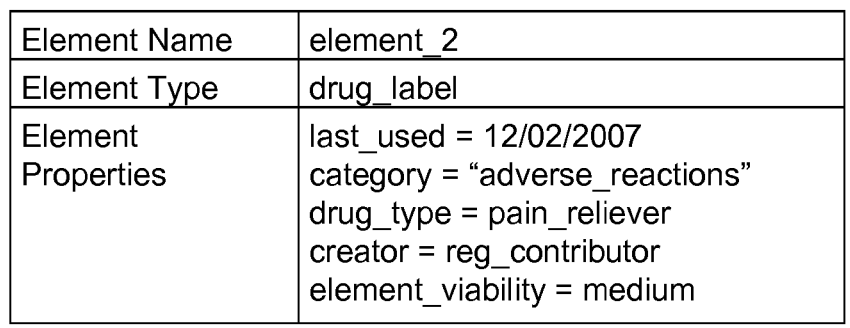
Figure 20:
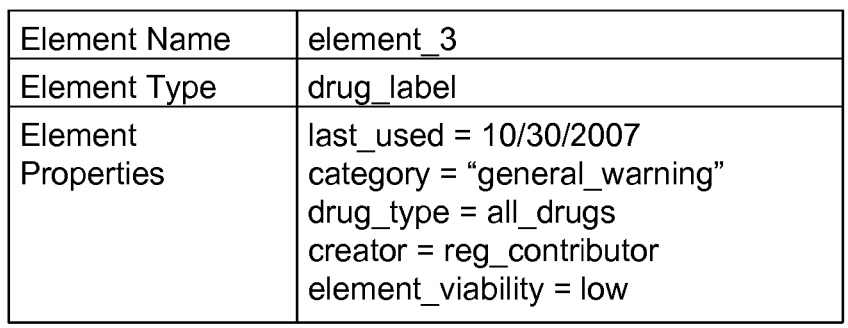

In the second example, a user who is a contributor attempts to delete element 800. Like in the first example, the element deletion mechanism checks the properties of element 800 against viability policy 1600 to determine a viability value for the element. Element 800 has a popularity of less than 50 percent by all document maps, so element 800 cannot have high viability (step 620=NO in FIG. 6). Since we assume element 800 has high probability, and element 800 has a popularity between 25 and 50 percent and was last used between Nov. 1, 2007 and Dec. 10, 2007, element 800 meets the medium viability requirements (step 640=YES in FIG. 6) and is assigned medium viability (step 650 in FIG. 6) as shown in FIG. 19.

The element deletion mechanism then turns to the deletion policy to determine if element 800 can be deleted. Test (1) fails because the user is a contributor, not an administrator. Test (2) fails because the viability is medium which is not equal to low. Test (3) passes because the element was created by a contributor (step 520=YES in FIG. 5), so element 800 is deleted (step 530 in FIG. 5). In addition, notification is sent that element 800 has been deleted (step 550 in FIG. 5).

In the third example, an administrator attempts to delete element 900. Like in the first example, the element deletion mechanism checks the properties of element 900 against viability policy 1600 to determine a viability value for the element. Element 900 has a probability of less than high, so element 900 cannot have high viability (step 620=NO in FIG. 6). Element 900 has a popularity that does not fall between 25 and 50 percent, the probability is less than high, and element 900 has not been used between Nov. 1, 2007 and Dec. 10, 2007, so element 900 cannot have medium viability (step 640=NO in FIG. 6). Thus element 900 is assigned a viability value of "low" (step 660 in FIG. 6) shown as element 900 in FIG. 20.

The element deletion mechanism then turns to the deletion policy to determine if element 900 can be deleted. Test (1) passes because the user is an administrator and the viability is low which is less than high, so the element can be deleted (step 520=YES in FIG. 5), and element 900 is deleted (step 530 in FIG. 2). In addition, notification is sent that element 900 has been deleted (step 550 in FIG. 5).

The disclosure and claims herein allow taking into account properties of elements that are not represented in any explicit relationships in the repository. This allows on-the-fly use of elements to be accounted for in determining whether or not to allow deletion of an element in the repository. In one specific implementation described herein, properties that represent probability, popularity and recent usage of elements are logged, and a viability policy then determines a viability value for an element based on the logged properties. A deletion policy is also defined in terms of the viability value of an element, and may additionally include the role of a user in determining whether to allow deletion of an element. The deletion policy may also specify whether notification to a user should be performed when successful deletion of an element is performed or when unsuccessful deletion of an element is attempted.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, while the examples in the figures and discussed above related to XML documents, the disclosure and claims herein expressly extend to content management systems that handle any suitable type of content, whether currently known or developed in the future.

The invention claimed is:

1. An apparatus comprising:
at least one processor;
a memory coupled to the at least one processor;
a repository residing in the memory that includes a plurality of elements;
a content management system residing in the memory and executed by the at least one processor, the content management system managing the plurality of elements in the repository, the content management system comprising:
properties for the plurality of elements in the repository that are not represented in any explicit relationships in the repository, wherein the properties comprise probability of reuse, popularity of use, and time of recent usage;
a deletion policy that specifies criteria for deleting the plurality of elements according to the properties and according to role of a user making a request to delete a selected one of the plurality of elements;
an element deletion mechanism that receives the request to delete the selected one element, determines whether the properties for the selected one element and the role of the user satisfy the deletion policy, and when the properties for the selected one element and the role of the user satisfy the deletion policy, the element deletion mechanism deletes the selected element from the repository, and when the properties for the selected one element and the role of the user do not satisfy the deletion policy, the element deletion mechanism not deleting the selected element from the repository; and
a viability generation mechanism that generates a viability value for the selected one element from the properties and from a viability policy that specifies criteria for setting the viability value according to the probability of reuse, popularity of use, and time of recent usage of the selected one element.

2. The apparatus of claim 1 further comprising an element update mechanism that specifies when the viability value for the selected one element should be updated.

3. The apparatus of claim 1 wherein the deletion policy specifies to notify a specified user that the selected one element has been deleted.

4. The apparatus of claim 1 wherein the deletion policy specifies to notify a specified user that a request was received to delete the selected one element.

5. A computer-implemented method for processing a request to delete a selected element by a content management system that manages a plurality of elements in a repository, the plurality of elements including the selected element, the method comprising the steps of:
(A) providing a computer with at least one processor;
(B) providing a memory coupled to the at least one processor;
(C) logging in the memory properties for the plurality of elements in the repository that are not represented in any explicit relationships in the repository, wherein the properties comprise probability of reuse, popularity of use, and time of recent usage;
(D) defining in the memory a deletion policy that specifies criteria for deleting the plurality of elements according to the properties logged in step (C) and according to role of a user making a request to delete a selected one of the plurality of elements;

(E) receiving from the user the request to delete the selected one element from the repository;

(F) determining whether the properties logged in step (C) for the selected element satisfy a deletion policy that specifies criteria for deleting the selected element according to the properties logged in step (C) and the role of the user;

(G) when the properties logged in step (C) for the selected element and the role of the user satisfy the deletion policy, deleting the selected element from the repository in response to the request received in step (E);

(H) when the properties logged in step (C) for the selected element and the role of the user do not satisfy the deletion policy, not deleting the selected element from the repository in response to the request received in step (E); and (I) generating a viability value for the selected one element from the properties logged in step (C) and from a viability policy that specifies criteria for setting the viability value according to the probability of reuse, popularity of use, and time of recent usage of the selected one element.

6. The method of claim 5 further comprising the step of specifying when the viability value for the selected one element should be updated.

7. The method of claim 5 further comprising the step of notifying a specified user that the selected one element has been deleted.

8. The method of claim 5 further comprising the step of notifying a specified user that a request was received to delete the selected one element.

9. An article of manufacture comprising:
(A) a content management system that manages a plurality of elements in a repository, the content management system comprising:
   properties for the plurality of elements in the repository that are not represented in any explicit relationships in the repository, wherein the properties comprise probability of reuse, popularity of use, and time of recent usage;
   a deletion policy that specifies criteria for deleting the plurality of elements according to the properties;
   an element deletion mechanism that receives a request to delete a selected one of the plurality of elements, determines whether the properties for the selected one element satisfy the deletion policy, and when the properties for the selected one element satisfy the deletion policy, the element deletion mechanism deletes the selected element from the repository, and when the properties for the selected one element do not satisfy the deletion policy, not deleting the selected element from the repository; and
   a viability generation mechanism that generates a viability value for the selected one element from the properties and from a viability policy that specifies criteria for setting the viability value according to the probability of reuse, popularity of use, and time of recent usage of the selected one element; and
(B) recordable media bearing the content management system.

10. The article of manufacture of claim 9 further comprising an element update mechanism that specifies when the viability value for the selected one element should be updated.

11. The article of manufacture of claim 9 wherein the deletion policy specifies to notify at least one user that the selected one element has been deleted.

12. The article of manufacture of claim 9 wherein the deletion policy specifies to notify at least one user that a request was received to delete the selected one element.

13. A computer-implemented method for processing a request to delete a selected element by a content management system that manages a plurality of elements in a repository, the plurality of elements including the selected element, the method comprising the steps of:
   providing a computer with at least one processor;
   providing a memory coupled to the at least one processor, the plurality of elements in the repository residing in the memory;
   logging in the memory probability each element in the repository will be used, past usage of each element in the repository, and last time each element in the repository was used;
   defining in the memory a viability policy that specifies criteria for setting a viability value for each of the plurality of elements in the repository according to the probability of reuse, popularity of use, and time of recent usage of each element;
   setting in the memory the viability value for each of the plurality of elements in the repository according to criteria in the viability policy;
   periodically updating in the memory the viability value for each of the plurality of elements according to a user-defined element update policy;
   receiving from a user a request to delete the selected element from the repository;
   determining whether the viability value for the selected element satisfies a user-defined deletion policy that specifies criteria in terms of probability each element will be used, past usage of each element, last time each element was used, and a role of the user making the request to delete the selected element;
   when the viability value of the selected element and the role of the user satisfy the deletion policy, deleting the selected element from the repository and notifying at least one user the selected element has been deleted; and
   when the viability value of the selected element and the role of the user do not satisfy the deletion policy, not deleting the selected element from the repository and notifying at least one user the selected element was requested to be deleted.

* * * * *